United States Patent [19]
Marsh

[11] 3,885,433
[45] May 27, 1975

[54] APPARATUS FOR MEASURING THE VELOCITY OF FLOW OF AN ELECTRICALLY CONDUCTIVE FLUID

[75] Inventor: Lawrence B. Marsh, Silver Spring, Md.

[73] Assignee: Marsh, McBirney Inc., Rockville, Md.

[22] Filed: Sept. 21, 1973

[21] Appl. No.: 399,734

[52] U.S. Cl. .............................. 73/194 EM; 73/181
[51] Int. Cl. ............................................ G01f 1/00
[58] Field of Search ....................... 73/181, 194 EM

[56] References Cited
UNITED STATES PATENTS

| | | | |
|---|---|---|---|
| 3,161,047 | 12/1964 | Griswold | 73/181 X |
| 3,449,951 | 6/1969 | Westersten | 73/194 EM |
| 3,668,931 | 6/1972 | Zanker et al. | 73/181 |
| 3,696,674 | 10/1972 | Spencer | 73/194 EM |
| 3,757,773 | 9/1973 | Kolin | 73/194 EM X |
| 3,759,097 | 9/1973 | Cushing | 73/194 EM |
| 3,775,673 | 11/1973 | Watanabe | 73/194 B X |

*Primary Examiner*—Charles A. Ruehl
*Attorney, Agent, or Firm*—Lawrence E. Laubscher

[57] ABSTRACT

An electromagnetic velocity meter in which an electrical signal is generated in response to relative motion between the velocity meter and a conductive fluid in a magnetic field generated by means in the velocity meter, to provide a measure of the velocity of the relative motion. The velocity meter is particularly useful as a ships's log. The velocity meter is circular in cross-section and has at least a pair of electrodes for sensing the electrical signal, the electrodes being disposed on the flow meter in a manner to minimize error in the velocity readings of the meter. This is accomplished by providing an electrode configuration on the meter in the form of an arcuate segment extending along a sector of the circular cross-section of the meter or providing electrically coupled pairs of electrodes which are spaced along the circumference of the circular cross-section of the meter forming paired electrode couples.

2 Claims, 7 Drawing Figures

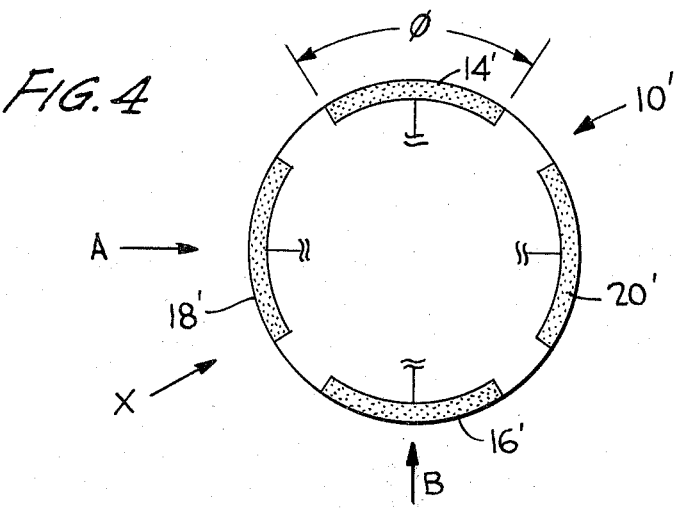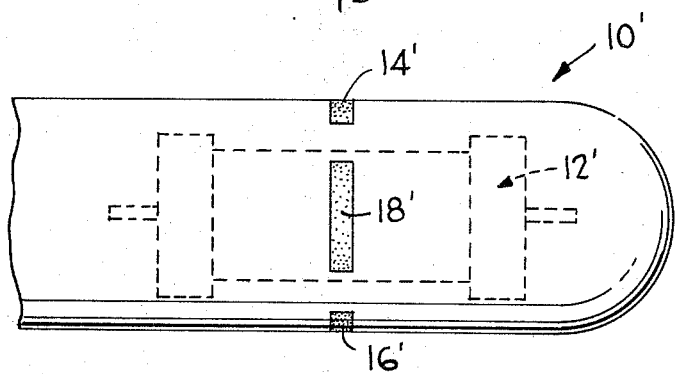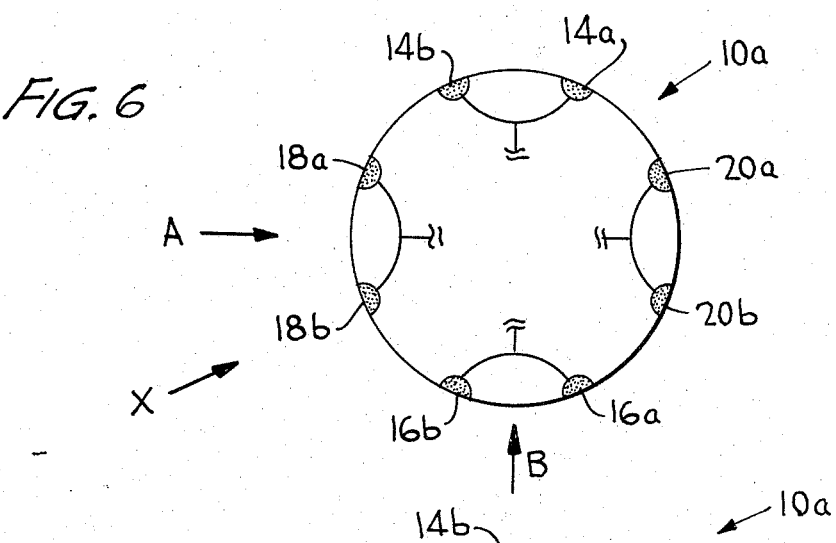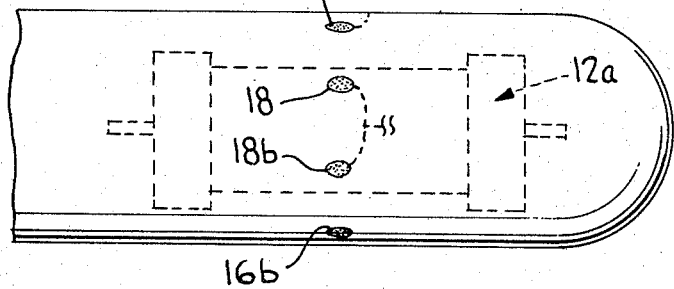

APPARATUS FOR MEASURING THE VELOCITY OF FLOW OF AN ELECTRICALLY CONDUCTIVE FLUID

BACKGROUND OF THE INVENTION

1. Field of the Invention

This invention relates to a velocity meter for providing an electrical signal depending on the speed of movement thereof relative to an electrically conductive fluid, and more specifically, an electromagnetic ship's log.

2. Description of the Prior Art

Velocity meters for providing an electrical signal dependent on the speed of movement thereof relative to an electrically conductive fluid, such as water, are well known.

Such a velocity meter usually includes a probe which is adapted to be immersed in the conductive fluid, such as water, when the meter is used as a ship's log or when stationary, as a current velocity sensor. A pair of electrodes are embedded in the surface of the probe, whose axis of revolution is perpendicular to the direction of flow of fluid sensed by the probe. The probe carries means for generating a magnetic field so that motion of the probe through water, for example, which is, of course, a conductive fluid, in the presence of the magnetic field generated from the probe will cause a voltage to exist between the electrodes which is proportional to the velocity of the flow of the fluid. This voltage can be monitored to provide an indication of the speed of the ship through the water, or the velocity of water past a stationary probe. In order to obtain this reading, the electrodes are arranged on each of the two leading quadrants of the surface of the probe.

By placing a further pair of electrodes at 90° increments and measuring the potential difference generated between these electrodes, it is possible to obtain the speed of the ship in a fore-aft direction, as well as the drift velocity of the ship in a lateral direction. By comparing the two potential differences, the drift angle can be simply computed.

The electrodes are equally spaced about the periphery of the probe to provide a plurality of electrical signals dependent on the vector components of the speed of relative movement of the meter and the electrically conductive fluid.

The voltage present between each electrode pair will be a function of the cosine and sine of the angle formed by (1) that component of flow perpendicular to the longitudinal axis of the probe and (2) a reference line perpendicular to the longitudinal axis of the probe and in line with one electrode pair. If the absolute value of the velocity vector is plotted as a function of this angle through 360°, the absolute value of the vector should ideally lie on a point of a circle depending on the particular angle of flow observed. In practice, however, an 8 to 10 percent error from the ideal value has been found to take place.

It is not exactly known why there is such an error in the velocity reading. The flow of any fluid in the boundary layer changes from a laminar nature to a turbulent nature shortly after it passes the widest chord of the cylindrical probe. Theoretically, this turbulent layer does not proportionally produce the same voltage as is produced in the leading semicircle. Thus, if the flow direction is such as to place an electrode in this turbulent area, a smaller voltage is produced than would be expected from just a cosine effect.

SUMMARY OF THE INVENTION

As stated, the aforementioned problem of lack of true sine and cosine response in sensing the velocity components at each electrode of the velocity meter is believed to be due to a transition of fluid velocity in the boundary layer of the fluid flow at the electrodes, wherein the boundary layer flow changes from laminar to turbulent. In order to overcome this problem and to minimize the error noted, it has been determined that if the electrode configuration is changed so as to extend for a substantial arc along the surface of the probe or to comprise a sector of a circle of approximately 60° to 80°, the error is minimized to an extent wherein it disappears and there is true sine and cosine response of the various velocity vectors measured by the velocity meters. Alternatively, it has been found that the same result could be achieved by replacing each arcuate electrode by a plurality of smaller electrodes, and electrically connecting each plurality of electrodes.

BRIEF DESCRIPTION OF THE DRAWINGS

FIG. 4 is a front view in elevation of the probe of an electromagnetic ship's log embodying one form of the present invention;

FIG. 5 is a side view in elevation of the probe shown in FIG. 4;

FIG. 6 is a front view in elevation of an alternative probe of an electromagnetic ship's log embodying the concepts of the present invention; and FIG. 7 is a front view in elevation of the probe illustrated in FIG. 6.

DETAILED DESCRIPTION OF THE PREFERRED EMBODIMENTS

Figure 1:
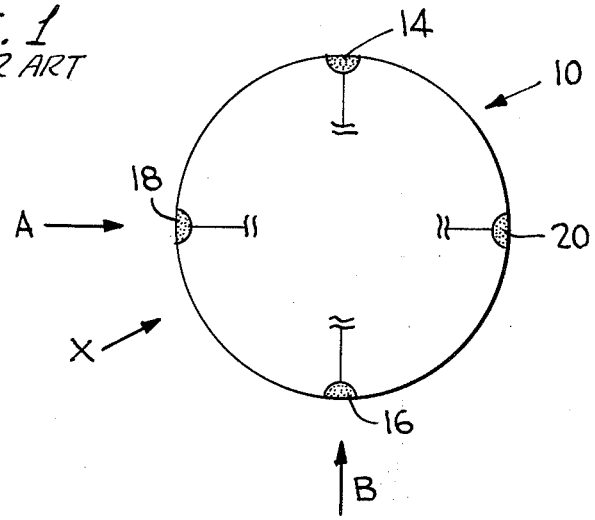
FIG. 1 is a front view in elevation of a probe of an electromagnetic ship's log which has been in common use heretofore.
Figure 2:
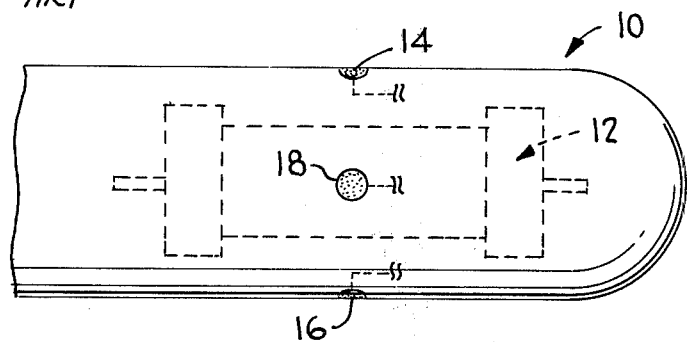
FIG. 2 is a partial side view in elevation of the probe shown in FIG. 1.

Referring now to the drawings in detail, wherein like numerals indicate like elements throughout the several views, and with particular reference to FIGS. 1 and 2, initially, the probe of a ship's log or velocity meter having a generally circular cross-section is indicated by the numeral 10. The probe 10 is carried by a ship so that water is caused to flow around the probe at right angles to its longitudinal axis as shown by the arrow X in FIG. 1.

The probe is provided with a coil assembly 12 for generating a magnetic field having a component at right angles to the general direction of flow, when energized. The coil assembly 12 does not comprise any portion of the instant invention and is well known in the art. A typical coil assembly which can be used with the probe of the present invention is described in detail in U.S. Pat. No. 3,668,931. When the velocity meter is in operation, the coil assembly 12 is energized by a power supply inside the ship via connecting wires to generate the required magnetic field.

Two pairs of electrodes 14, 16 and 18, 20 are usually disposed at the ends of two perpendicular diameters of the probe 10, respectively. Motion of the probe or log through water, which is a conductive fluid, in the presence of the magnetic field generated by the coil assembly 12, will induce a potential difference between the electrode pairs 14, 16 and 18, 20, the potential difference being proportional to the velocity of flow of the conductive fluid. Further means (not shown) are provided so that the voltages developed can be monitored on the ship to provide an indication of the speed of the ship through the water.

With the arrangement of the electrodes as shown in FIGS. 1 and 2, the arrow X represents the direction of flow of the conductive water past the probe, and the two perpendicular components of the flow, in the directions A and B, are measured. Thus, if the probe is positioned so that the direction A is the fore-and-aft direction of the ship, then the potential difference developed between the electrodes 14, 16 will be indicative of the velocity made along the ship's heading, and that developed between the electrodes 18, 20 in direction B is indicative of the drift velocity of the ship. By comparing these two potential differences, the drift angle can be simply computed.

Figure 3:
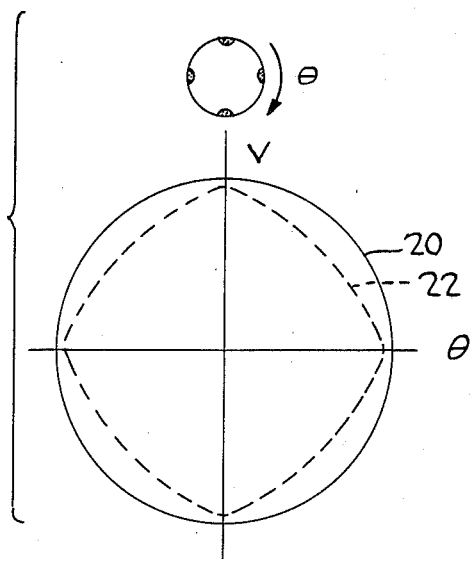
FIG. 3 is a graphic representation illustrating the ideal and actual conditions of velocity measurement utilizing the probe illustrated in FIGS. 1 and 2.

As illustrated in FIG. 3, the voltages sensed by each of the electrodes will be a function of the cosine and sine of the angle $\theta$ wherein $\theta$ is the angle that an imaginary line intersecting an electrode pair makes with the direction of water flow. In other words, the velocity vector will be broken into two components and the two voltages (representing those two components) present at each electrode pair will be sensed and will be a function of either the sine or cosine of the angle $\theta$. As illustrated in FIG. 3, the velocity vector impinging at any position on the probe, when plotted against $\theta$ through 360°, should ideally be graphically represented by the circle 20. In practice, however, an 8 to 10 percent error has been noted and the actual value of the velocity is represented in FIG. 3 by the dotted line 22, and as graphically illustrated, the dotted line falls within the circle 20.

It is not exactly known why there is an error in the velocity readings as indicated. It is believed, theoretically, that the flow of the conductive fluid changes from a laminar to turbulent nature shortly after it passes the widest chord of the cylindrical probe. Theoretically, this turbulent layer does not proportionally produce the same voltage as is produced in the leading semicircle. Thus, if the flow direction is such as to place an electrode in this turbulent area, a smaller voltage is produced than would be expected from just a cosine effect.

In order to obtain a true velocity reading as indicated by the circle 20 in FIG. 3, it has been found that by changing the electrode configuration on the probe as shown in FIGS. 4 and 5, a true velocity reading for all angles can be obtained. It has been found that by using an electrode configuration as shown in FIGS. 4 and 5, the error in the velocity reading is completely eliminated and the velocity vector will trace a perfect circle such as 20 in FIG. 3 when plotted against the angle $\theta$.

FIGS. 4 and 5 illustrate a probe 10' of a ship's log which is similar to the probe 10 in FIGS. 1 and 2 in that it is substantially circular in cross-section and includes a coil assembly 12' for generating a magnetic field perpendicular to the axis of the probe 10'. The electrodes embedded on the surface of probe 10' are substantially different however.

As illustrated in FIG. 4, the electrodes are arranged in opposing pairs as in the prior art, but have a substantial arcuate length which ideally subtends an angle $\phi$ of approximately 60° to 80° along the circumference of the probe 10'.

The electrode pairs 18' and 20' measure the drift velocity of the ship whereas the electrodes 14' and 16' will give a true measure of the fore-and-aft velocity of the ship through a sine and cosine response which is circular in accordance with the graphic representation 20 in FIG. 3.

The phenomenon of true velocity measurement using the probe illustrated in FIGS. 4 and 5 is not completely understood, but it is believed that the placement of the sensing electrodes outside of the boundary layer of the conductive fluid along the probe surface minimizes the effect of decreased emf caused by the flow changing from laminar to turbulent adjacent to the probe in the two aft quadrants.

FIGS. 6 and 7 illustrate still another electrode configuration which has been found to be satisfactory in reducing and eliminating the error in velocity reading.

In FIGS. 6 and 7, probe 10a which is circular in cross-section as probes 10 and 10', is provided with a plurality of electrode couples spaced about the circumference of the probe 10a. For example, electrode pairs 14a and 14b, 16a and 16b, 18a and 18b, and 20a and 20b, respectively, comprise electrode couplings corresponding to the electrodes 14', 16', 18', and 20' of probe 10'. Each of the electrode couples, such as 14a, 14b, are electrically connected to provide a single response such as would be obtained from electrode 14'. It has been found that the electrode couples such as 14a, 14b, should be spaced approximately 50° to 70° from each other about the circumference of the probe 10a.

Once again, with use of the probe 10a and the electrode pairs or couples, a true velocity response as illustrated by the circle 20 in FIG. 3 is obtained. As with the probe 10', it is not fully understood why the response is obtained but it is believed that because of the increased surface contact (at these particular locations) with the conductive fluid, a more accurate velocity indication is obtained.

Although the invention has been described with reference to a probe for use as a ship's log, with the water as the conductive fluid, the invention may equally well be used to measure the velocity of flow of any electrically conductive fluid.

What is claimed is:

1. A velocity meter for measuring the relative speed of movement of an electrically conductive fluid, comprising
   a. a cylindrical probe adapted for insertion into the fluid normal to said direction of relative movement, said probe having a circular cross-section;
   b. means arranged within said probe for producing a magnetic field in the fluid parallel to the longitudinal axis of said probe; and
   c. means for generating an electric signal which is a function of the velocity of the fluid relative to said probe, said generating means including a plurality of electrode means mounted on the outer circumferential surface of said probe in a plane normal to the axis thereof, a first pair of said electrode means being diametrically arranged on said probe and a second pair of said electrode means being diametrically arranged on a diameter normal to the diameter of said first electrode means, each of said electrode means comprising an arcuate electrode which is a sector of a circular cylinder and the outer circumference of which conforms with the circumferential surface of said probe, said arcuate electrode subtending an angle of between 60° to 80° of the circumference of said probe.

2. A velocity meter for measuring the relative speed of movement of an electrically conductive fluid, comprising a. a cylindrical probe adapted for insertion into the fluid normal to said direction of relative movement, said probe having a circular cross-section;

b. means within said probe for producing a magnetic field in the fluid parallel to the longitudinal axis of said probe; and c. means for generating an electric signal which is a function of the velocity of the fluid relative to said probe, said generating means including a plurality of electrode means mounted on the outer circumferential surface of said probe in a plane normal to the axis thereof, a first pair of said electrode means being diametrically arranged on said probe and a second pair of said electrode means being diametrically arranged on a diameter normal to the diameter of said first electrode means, each of said electrode means comprising a pair of electrodes circumferentially spaced to subtend an angle of between 50° to 70°, the electrodes of each pair being electrically connected so as to provide a single response.

* * * * *